United States Patent
Fang

(10) Patent No.: US 9,917,623 B1
(45) Date of Patent: Mar. 13, 2018

(54) DIGITAL BEAMFORMING ARCHITECTURE

(71) Applicant: Space Systems/Loral, LLC, Palo Alto, CA (US)

(72) Inventor: Jun Fang, San Jose, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 0 days.

(21) Appl. No.: 15/225,525

(22) Filed: Aug. 1, 2016

(51) Int. Cl.
*H04B 7/04* (2017.01)
*H04B 7/185* (2006.01)
*H04B 7/0456* (2017.01)

(52) U.S. Cl.
CPC ....... *H04B 7/0456* (2013.01); *H04B 7/18513* (2013.01)

(58) Field of Classification Search
CPC .......................... H04B 7/0456; H04B 7/18513
See application file for complete search history.

(56) References Cited

U.S. PATENT DOCUMENTS

| 5,894,473 A | 4/1999 | Dent |
| 6,411,979 B1 | 6/2002 | Greenberger |
| 2006/0055599 A1* | 3/2006 | McIntire ............ H01Q 21/0093 342/368 |
| 2007/0192399 A1* | 8/2007 | Krithivasan ........ G06F 7/49994 708/620 |
| 2009/0268603 A1 | 10/2009 | Sampath et al. |
| 2009/0270051 A1 | 10/2009 | Choi et al. |
| 2010/0184370 A1 | 7/2010 | Zheng et al. |
| 2013/0163705 A1 | 6/2013 | Stirland |
| 2015/0039856 A1 | 2/2015 | Pitsianis et al. |

FOREIGN PATENT DOCUMENTS

WO    WO 1995/028747    10/1995

OTHER PUBLICATIONS

Extended European Search Report dated Jan. 2, 2018 in EP Application No. 17180798.5.

* cited by examiner

*Primary Examiner* — David B. Lugo
(74) *Attorney, Agent, or Firm* — Weaver Austin Villeneuve & Sampson LLP

(57) ABSTRACT

This disclosure provides systems, methods and apparatus for digital beamforming. In one aspect, a subsystem of a spacecraft can include multipliers and a data distribution network including adders to provide beamformed signals.

20 Claims, 6 Drawing Sheets

DIGITAL BEAMFORMING ARCHITECTURE

TECHNICAL FIELD

This disclosure relates generally to beamforming, and more particularly to a digital beamforming system architecture.

BACKGROUND

Spacecraft for communications and broadcast services can operate in orbit to communicate with a user terminal (or ground device) by way of a forward user downlink signal (transmitted by the spacecraft) and a return user uplink signal (transmitted by the user terminal) that communicatively couple the user terminal and the spacecraft. The operational parameters, such as effective isotropically radiated power (Eirp), antenna gain-to-noise temperature (G/T), space-ground relative positioning, antenna pointing, etc., of the forward user downlink signal and the return user uplink signal can drift over time, for example, due to temperature changes on the spacecraft, drifts in orbit, etc.

Beamforming is a technique in which feed array antennas are configured to geographical confined areas, referred as beams, for the forward user downlink signal and the return user uplink signal such that they are optimized in data capacity at a specific location of the user terminal. Beamforming coefficients can be used to adjust the phases and amplitudes of the forward user downlink signal and the user uplink signal at the feed array antenna transmitter and receiver, respectively, to form beams and to correct for drift of the pointing of the signals, and therefore, increase their data capacity.

Digital beamforming (DBF) systems can be used to perform the necessary calculations to perform beamforming. However, the calculations can involve a high number of multiplications and additions, resulting in a large computational load, limiting the applicability of DBF in large-scale systems.

Thus, an improved system for performing the calculations for digital beamforming is desired.

SUMMARY

The systems, methods and devices of this disclosure each have several innovative aspects, no single one of which is solely responsible for the desirable attributes disclosed herein.

One innovative aspect of the subject matter described in this disclosure can be implemented in a beamforming system comprising a first multiplier circuit configured to receive a first complex number representing an amplitude and a phase of a first signal and receive a first set of weightings, the first multiplier circuit configured to generate weighted real and weighted imaginary components of the first complex number derived from a multiplication of the first complex number with the first set of weightings; a second multiplier circuit configured to receive a second complex number representing an amplitude and a phase of a second signal and receive a second set of weightings, the second multiplier circuit configured to generate weighted real and weighted imaginary components of the second complex number derived from a multiplication of the second complex number with the second set of weightings; and a data distribution network with processing node processors configured to receive the weighted real and imaginary components of the first and second complex numbers and configured to generate a third complex number representing an adjusted amplitude and an adjusted phase of the first signal and generate a fourth complex number representing an adjusted amplitude and an adjusted phase of the second signal, the data distribution network including a first processing node configured to determine a sum of the weighted real and imaginary components of the first and second complex numbers and provide a first portion of the sum to a second processing node and a second portion of the sum to a third processing node such that the data distribution network generates the third complex number and the fourth complex number.

In some implementations, the first signal and the second signal are return user uplink signals or forward user downlink signals.

In some implementations, the first portion and the second portion are different halves of the sum.

In some implementations, the data distribution network includes a set of processing elements that are communicatively coupled to each other in a butterfly topology.

In some implementations, the first multiplier circuit further generates the weighted real and weighted imaginary components of the first complex number using a comparison of a first weighting and a second weighting of the first set of weightings.

In some implementations, the third and fourth complex numbers represent beamformed signals.

In some implementations, the first and second multiplier circuits are configured as Booth multipliers.

In some implementations, the weighted real and weighted imaginary components of the first complex number includes a first pair of weighted real and weighted imaginary components and a second pair of weighted real and weighted imaginary components, the weighted real and weighted imaginary components of the second complex number includes a first pair of weighted real and weighted imaginary components and a second pair of weighted real and weighted imaginary components.

In some implementations, the third complex number is derived from the first pairs of the weighted real and weighted imaginary components of the first complex number and the second complex number.

In some implementations, the fourth complex number is derived from the second pairs of the weighted real and weighted imaginary components of the first complex number and the second complex number.

Another innovative aspect of the subject matter described in this disclosure can be implemented in a beamforming system comprising a first multiplier circuit configured to receive a first complex number representing a first input signal and receive a first set of beamforming coefficients, the first multiplier circuit configured to generate an N number of partial products derived from a multiplication of the first complex number with the first set of beamforming coefficients; a second multiplier circuit configured to receive a second complex number representing a second input signal and receive a second set of beamforming coefficients, the second multiplier circuit configured to generate an N number of partial products derived from a multiplication of the second complex number with the second set of beamforming coefficients; and a data distribution network with processing node elements configured to receive the N number of partial products from the first multiplier circuit and the N number of partial products from the second multiplier circuit, and configured to generate a third complex number representing a first beamformed signal and a fourth complex number representing a second beamformed signal such that the third complex number is derived from a summation of a partial product from the N number of partial products from the first multiplier circuit and a partial product from the N number of partial products from the second multiplier circuit, and the fourth complex number is derived from a summation of a partial product from the N number of partial products from the first multiplier circuit and a partial product from the N number of partial products from the second multiplier circuit.

In some implementations, the first input signal and the second input signal are return user uplink signals or forward user downlink signals.

In some implementations, each processing node element of the data distribution network includes an adder configured to add two complex numbers to generate a summed result of the two complex numbers.

In some implementations, the data distribution network includes a first processing node element configured to provide a first portion of the summed result to a second processing node element and a second portion of the summed result to a third processing node element.

In some implementations, the first and second portions are different halves of the summed result.

In some implementations, the data distribution network includes a set of processing elements that are communicatively coupled to each other in a butterfly topology.

In some implementations, the first and second multiplier circuits are configured as Booth multipliers.

Another innovative aspect of the subject matter described in this disclosure can be implemented in a method comprising receiving, by a digital beamforming system, a first input signal and a second input signal; determining, by the digital beamforming system, a first complex number representing the first input signal and a second complex number representing the second input signal; receiving, by the digital beamforming system, a first set of beamforming coefficients and a second set of beamforming coefficients; determining, by the digital beamforming system, a first set of partial products derived from a multiplication of the first complex number with the first set of beamforming coefficients; determining, by the digital beamforming system, a second set of partial products derived from a multiplication of the second complex number with the second set of beamforming coefficients; determining, by the digital beamforming system, a first beamformed signal derived from a summation of a first partial product from the first set of partial products and a first partial product from the second set of partial products; and determining, by the digital beamforming system, a second beamformed signal derived from a summation of a second partial product from the first set of partial products and a second partial product from the second set of partial products.

In some implementations, the first input signal and the second input signal are return user uplink signals or forward user downlink signals.

In some implementations, determining the multiplications are in accordance with Booth's multiplication algorithm.

BRIEF DESCRIPTION OF THE DRAWINGS

The included drawings are for illustrative purposes and serve only to provide examples. These drawings in no way limit any changes in form and detail that may be made by one skilled in the art without departing from the spirit and scope of the disclosed embodiments.

Figure 1:
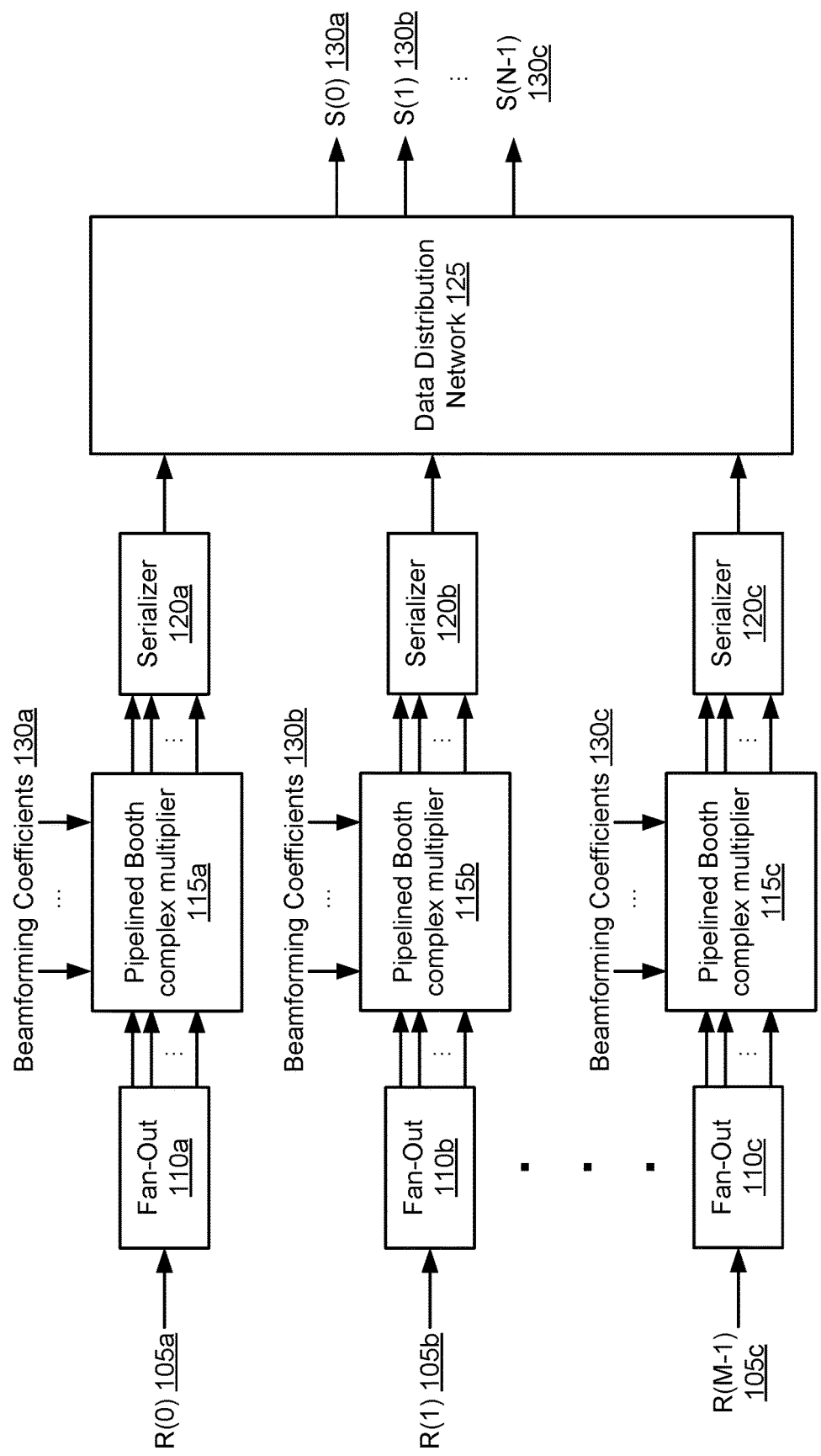
FIG. 1 is an example of a digital beamforming system.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Specific exemplary embodiments will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The terms "spacecraft", "satellite" may be used interchangeably herein, and generally refer to any orbiting satellite or spacecraft system.

A satellite communications network can include a satellite at an orbital location providing downlink communication services with a user terminal (e.g., a user device such as a phone, tablet, laptop, transportation vehicles such as airplanes, trains, ships, etc.) via generation of a forward user downlink signal. The user terminals can provide uplink communication with the satellite via generation of a return user uplink signal.

The satellite can incorporate beamforming to form geographical confined areas, or beams, of coverage for the signals by adjusting their phases and amplitudes at transmitters and receivers of feed array antennas of the satellite. The phases and amplitudes are adjusted by using beamforming coefficients representing adjustments to those phases and amplitudes of the signals. This allows the data capacity of the signals to be increased.

Digital beamforming (DBF) systems can be used to perform the necessary calculations to perform beamforming by applying the beamforming coefficients to the signals. However, those calculations can involve a significant number of calculations, resulting in a rather large computational load that may be time intensive. For example, if M beams are used to form N channels, then the DBF system should perform MN multiplications involving complex numbers and N(M−1) additions also involving complex numbers. Moreover, performing a high number of calculations can result in increased power requirements if the DBF system is not efficiently designed.

FIG. 1 is an example of a digital beamforming system, according to an implementation. For the reasons indicated hereinbelow, the digital beamforming system (DBF) system in FIG. 1 can efficiently perform the calculations for beamforming for a satellite, resulting in faster throughput compared to other DBF systems. The DBF system in FIG. 1 can also perform the calculations with lower power requirements than other DBF systems due to its architecture. Moreover, the DBF system in FIG. 1 can also be easier to implement, and therefore, simplify the placement and routing process if implemented in an application specific integrated circuit (ASIC), field programmable gate array (FPGA), or other semiconductor devices due to the repeatability of its architecture.

The DBF system in FIG. 1 includes two calculation stages. A first stage includes several multipliers to perform multiplications of complex numbers representing the input signals (e.g., return user uplink signals or forward user downlink signals) with complex numbers representing beamforming coefficients. The results of the multiplications are partial products of the full beamforming calculation. To provide the rest of the beamforming calculation, the second stage includes a data distribution network having several processing nodes including adders to perform additions of the partial products resulting from the first stage. This provides complex numbers representing the beamformed signals that can be provided to a channelizer circuit (e.g., for processing return user uplink signals) or to a feed array antenna for transmission (e.g., for transmitting forward user downlink signals).

Additionally, the DBF system in FIG. 1 can implement the multiplications of the beamforming calculations by employing a multiplier implementing Booth's multiplication algorithm. Booth's multiplication algorithm, in a pipeline implementation, can provide a high-speed performance of multiplication of complex numbers.

In more detail, input signals R(0) 105a, R(1) 105b, to R(M−1) 105c in FIG. 1 represent an M number of return user uplink signals (or forward user downlink signals) as input signals or source signals received at feeds for receivers of a feed array antenna. Fan-outs 110a-110c receive the return user uplink signals and provide the corresponding signal as a complex number and provides that complex number N times for each channel of the beamforming system. In some implementations, the complex number can be in a 2's complement fixed-point notation. Accordingly, fan-outs 110a-c can, for example, perform measurements on the signals and generate data representing the signals as complex numbers indicating the phases and amplitudes of the signals.

For example, fan-out 110a receives R(0) 105a and provides a complex number representing R(0) 105a to an N number of inputs of pipelined Booth complex multiplier 115a. Likewise, fan-out 110b receives R(1) 105b and provides a complex number representing R(1) 105b to an N number of inputs of pipelined Booth complex multiplier 115b. As a result, an M number of fan-outs up to R(M−1) 105c can also each provide an N number of inputs to separate pipelined Booth complex multipliers. As discussed later, each of pipelined Booth complex multipliers 115a-c contain an N number of multipliers to generate N partial products for the beamforming calculations. Each of the partial products is the result of the multiplication of the input provided by the fan-out with a different beamforming coefficient. As a result, an N number of partial products are generated by the multipliers.

Pipelined Booth complex multipliers 115a, 115b, and 115c are pipelined Booth multipliers implementing Booth's algorithm. The multipliers can also receive different sets of beamforming coefficients 130a, 130b, and 130c, respectively, to generate the partial products. For example, the inputs received from fan-out 110a-c can represent multiplicands and the beamforming coefficients can represent multipliers used to perform multiplication. As a result, each of the pipelined Booth complex multipliers can generate partial products based on the multiplication of the multiplicands (i.e., complex number representations of the input signals) with the multipliers (i.e., beamforming coefficients).

In FIG. 1, each of the partial products from the pipelined Booth complex multipliers are then provided to a serializer for transmission to data distribution network 125. Data distribution network 125 can add together the partial products to generate complex numbers S(0) 130a, S(1) 130b to S(N−1) 130c representing an N number of beamformed signals. For example, each of the N partial products from pipelined complex Booth multiplier 115a are provided to serializer 120a. Likewise, each of the N partial products from pipelined complex Booth multiplier 115b are provided to serializer 120b, and so forth. As discussed later herein, data distribution network 125 can add the partial products to generate N complex numbers representing beamformed signals S(0) 130a, S(1) 130b to S(N−1) 130c. Each of the beamformed signals can be the result of the summation of a partial product from each of the multipliers. As a result, beamformed signals S(0) 130a, S(1) 130b to S(N−1) 130c represent input signals R(0) 105a, R(1) 105b, to R(M−1) 105c that are adjusted (e.g., multiplied with) according to the beamforming coefficients.

Figure 2:
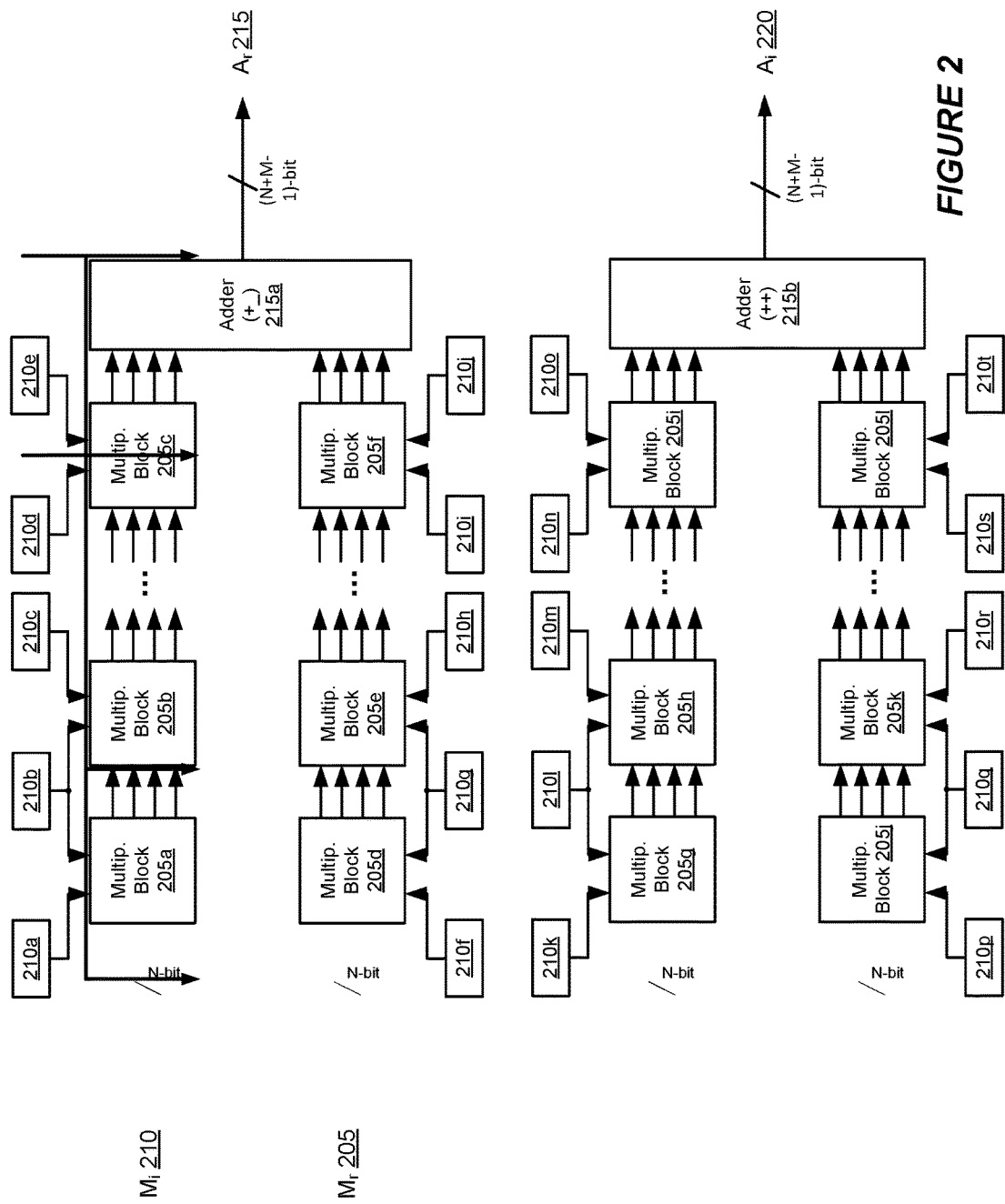
FIG. 2 is an example of a pipelined multiplier of the digital beamforming system.

FIG. 2 is an example of a pipelined multiplier of the digital beamforming system. For example, the pipelined multiplier in FIG. 2 can be one of an N number of multipliers of pipelined Booth complex multiplier 115a in FIG. 1. The pipelined multiplier in FIG. 2 can provide two pipelined datapaths, one to calculate the real component $A_r$ 215 of a partial sum and another to calculate the imaginary component $A_i$ 220 of the same partial sum based on the multiplication of $M_r$ 205 and $M_i$ 210 representing the real and imaginary components, respectively, of R(0) 105a multiplied with beamforming coefficients.

For example, in FIG. 2, memory 210a-t (e.g., registers) can be used to store the beamforming coefficients that are provided to the pipelined multiplication blocks 205a-1. The multiplication can be performed with the beamforming coefficients being the multipliers to the multiplicands provided to multiplication blocks 205a-1 (e.g., $M_r$ 205 and $M_i$ 210 for multiplication block 205a and the output of multiplication block 205a for multiplication block 205b, etc.). If the beamforming coefficients need to be updated, then memory 210a-t can be updated to reflect the new beamforming coefficients.

Adders 215a and 215b can sum the results of the pipelined multipliers 205a-f and 205g-1, respectively, to provide a partial product represented by a complex number with a real component $A_r$ 215 and an imaginary component $A_i$ 220. Since N pipelined multipliers are implemented by each pipelined Booth complex multiplier, this results in an N number partial products being generated, each as a complex number with a real component and an imaginary component.

As previously discussed, $M_r$ 205 and $M_i$ 210 can represent the real and imaginary components of the complex number generated by fan-out 110a. As a result, $M_r$ 205 and $M_i$ 210 are provided as inputs to the first multiplication blocks 205a and 205d of the pipelined datapaths. The beamforming coefficients stored in memory 210a-t can then be applied at various stages (e.g., multiplication blocks 205a-1) of the two pipelined datapaths to generate a partial product with a real component $A_r$ 215 and an imaginary component $A_i$ 220.

Figure 3:
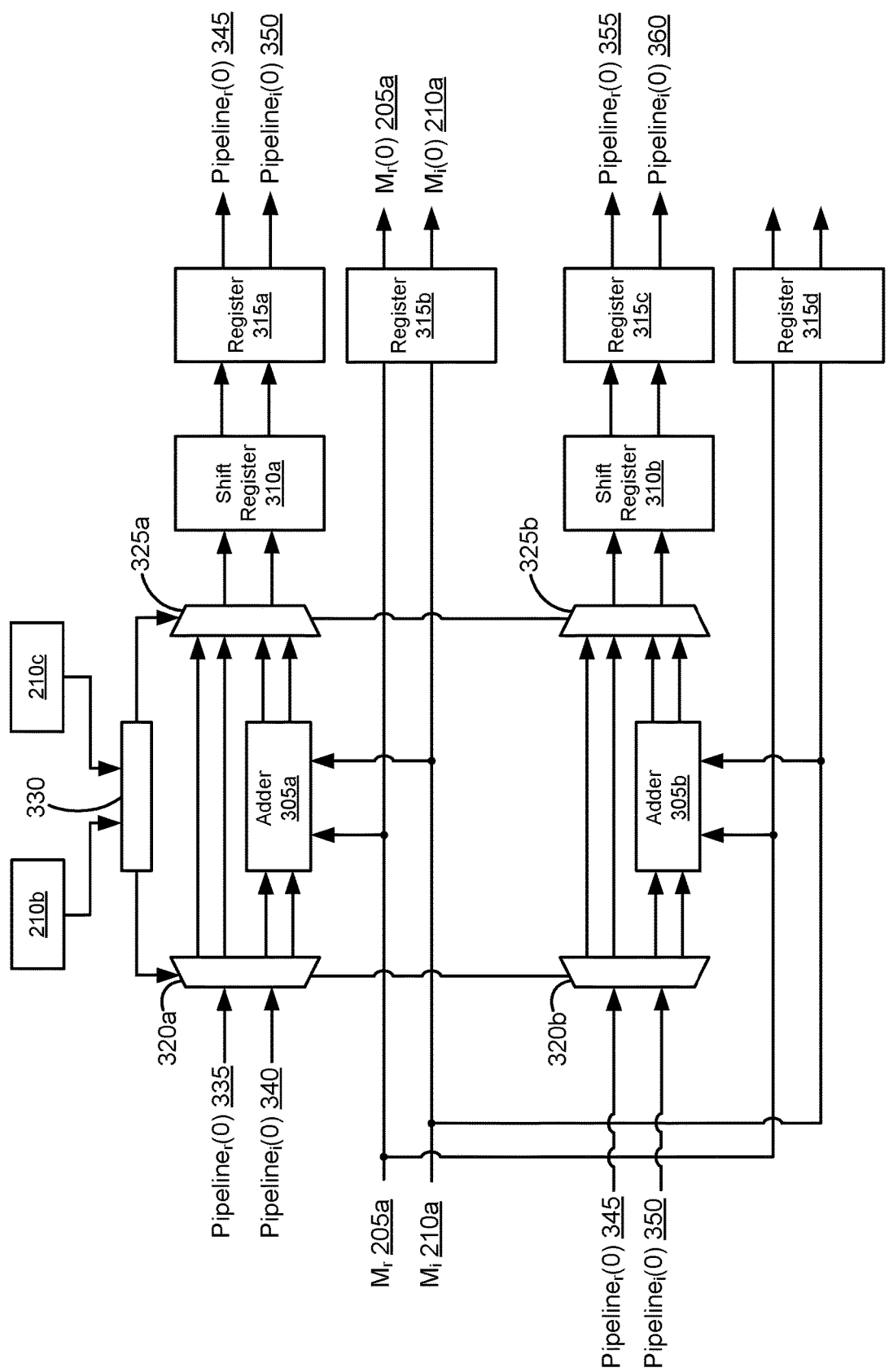
FIG. 3 is an example of a multiplier block of the pipelined multiplier.

FIG. 3 is an example of a multiplier block of the pipelined multiplier. For example, the multiplier in FIG. 3 can be multiplier block 205b. In FIG. 3, pipelined data Pipeline$_r$(0) 335 and Pipeline$_i$(0) 340, and Pipeline$_r$(0) 345 and Pipeline$_i$(0) 350 represent the real and imaginary components that are the results of prior multiplication blocks (e.g., multiplication block 205a if FIG. 3 portrays multiplication block 205b). They also represent multiplicands to be multiplied with the multipliers (i.e., the beamforming coefficients).

Regarding the top datapath with Pipeline$_r$(0) 335 and Pipeline$_i$(0) 340, demultiplexer 320a receives Pipeline$_r$(0) 335 and Pipeline$_i$(0) 340 and provides Pipeline$_r$(0) 335 and Pipeline$_i$(0) 340 to one of two different datapaths: one in which Pipeline$_r$(0) 335 and Pipeline$_i$(0) 340 are provided to multiplexer 325a, or another in which Pipeline$_r$(0) 335 and Pipeline$_i$(0) 340 are added with $M_r$ 205 and $M_i$ 210 by adder 305a and then provided to multiplexer 325a. The datapath selected to receive Pipeline$_r$(0) 335 and Pipeline$_i$(0) 340 can be based on a comparison of the beamforming coefficients stored in memory 210b and 210c.

In particular, comparator 330 compares the bits of the beamforming coefficients from memory 210b and 210c for multiplication block 205b, for example, by performing a bit-by-bit comparison of the beamforming coefficients. If similar bits (e.g., bits in the same position, such as the first bit, the second bit, etc. from both of the beamforming coefficients) are the same, such as both being "1" or "0," then demultiplexer 320a selects Pipeline$_r$(0) 335 and Pipeline$_i$(0) 340 to be provided to multiplexer 325a, bypassing adder 305a.

By contrast, if the bits are different, then demultiplexer 320a selects Pipeline$_r$(0) 335 and Pipeline$_i$(0) 340 to be provided to adder 305a. This results in Pipeline$_r$(0) 335 and Pipeline$_i$(0) 340 being added with $M_r$ 205 and $M_i$ 210. The resulting complex number can then be provided to multiplexer 325a.

Multiplexer 325a selects a similar datapath to be provided to shift register 310a. That is, the datapath selected by demultiplexer 320a is the same datapath selected by multiplexer 325a because the selections are controlled by the result of the comparison of the beamforming coefficients by comparator 330. Shift register 310a can shift the bits (e.g., by 1 bit in accordance with the Booth's algorithm) and the results can be stored in register 315a and provided as Pipeline$_r$(0) 345 and Pipeline$_i$(0) 350 to be provided as the inputs and multiplicands to the next multiplier block. The bottom datapath works in a similar manner to provide Pipeline$_r$(0) 355 and Pipeline$_i$(0) 360 to the next multiplier block. For example, demultiplexer 320b provides Pipeliner(0) 345 and Pipelinei(0) 350 to either multiplexer 325b or adder 305b based on the comparison of the beamforming coefficients stored in memory 210b and 210c. Multiplexer 325b also selects among its inputs based on the comparison of the bits of the beamforming coefficients stored in memory 210b and 210c. Registers 315c and 315d store corresponding results of the multiplier block.

Returning to FIG. 2, following the final multiplication blocks 205c and 205f, adders 215a and 215b add the results to provide $A_r$ 215 and $A_i$ 220, which are the real and imaginary components of a partial product, respectively, calculated by the pipelined Booth complex multiplier. Since each pipelined Booth complex multiplier 115a-c in FIG. 1 implements an N number of the multipliers in FIG. 2, this results in each providing an N number of different partial products. These partial products then need to be selectively added together to provide a complex number representative of beamformed signals R(0) 105a to R(M−1) 105c. For example, partial products from different multipliers can be summed together to provide each of the beamformed signals R(0) 105a to R(M−1) 105c.

Figure 4:
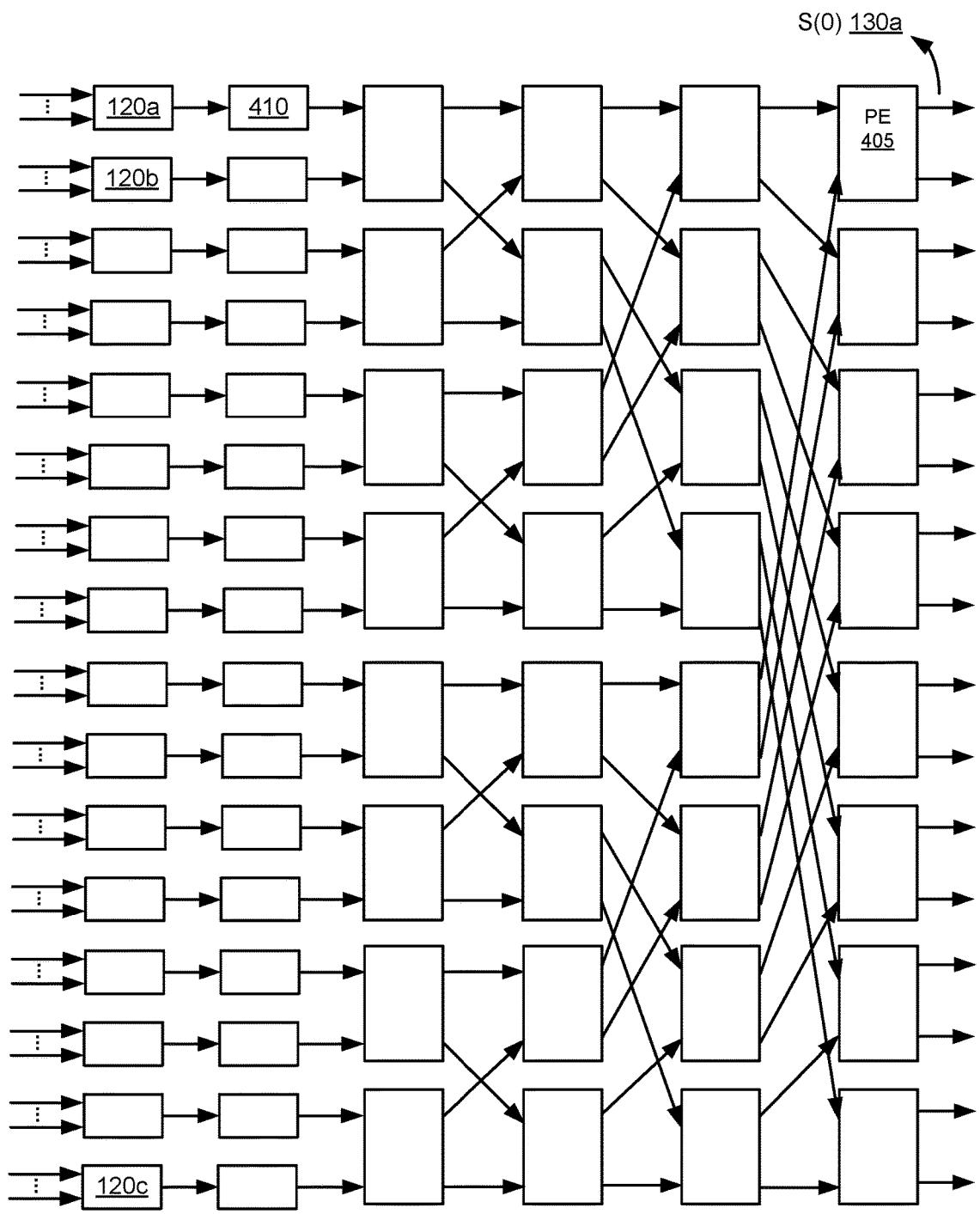
FIG. 4 is an example of a data distribution network of the digital beamforming system.

FIG. 4 is an example of a data distribution network of the digital beamforming system. The data distribution network in FIG. 4 can selectively add the partial sums generated by the pipelined Booth complex multipliers 115a-c in FIG. 1 and generate an N number (e.g., sixteen in FIG. 4) of beamformed output signals such as S(0) 130a (to S(N−1) 130c) as depicted in FIG. 4.

In FIG. 4, serializers (e.g., serializer 120a as depicted in FIG. 4) serialize the partial products from the respective multipliers and provide the partial products to processing elements 405 forming a data distribution network. In some implementations, time-division multiplexing (TDM) framers 410 can be implemented to provide the serialized partial products to the processing elements 405 of the data distribution network. For example, the TDM framers can provide the serialized partial products in separate frames, or units of transmission, with metadata indicating the processing element 405 that should be provided the serialized partial product, as well as a word including the real and imaginary components of the serialized partial product. This may be useful if processing elements 405 of the data distribution network are all communicatively coupled to the same bus interconnect. However, in other implementations, TDM framer 410 can be removed and the processing elements 405 can be coupled as depicted in FIG. 4. Accordingly, processing elements 405 can be set up in a variety of ways such that they are communicatively coupled as in the depiction in FIG. 4. For example, in FIG. 4, the processing elements 405 of the data distribution network are communicatively coupled in accordance with a butterfly topology.

Figure 5:
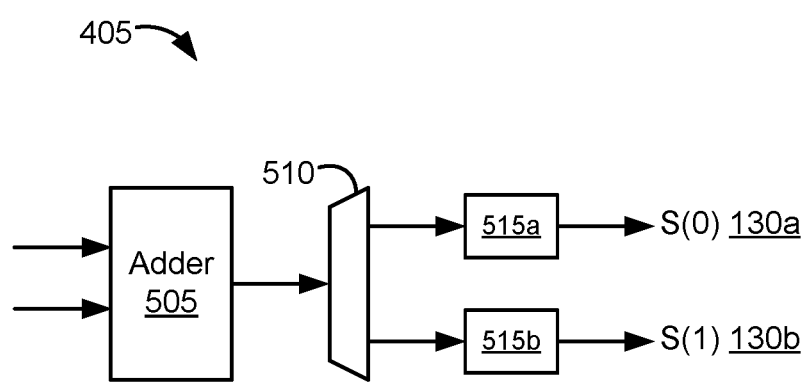
FIG. 5 is an example of a processing node of the data distribution network.

FIG. 5 is an example of a processing node of the data distribution network. In FIG. 5, the processing node includes adder 505, demultiplexer 510, and memory elements 515a and 515b. In some implementations, memory elements 515a and 515b can be random-access memory (RAM).

As depicted in FIG. 5, processing nodes 405 include adder 505 configured to receive two inputs (e.g., partial products provided by serializer 120a and serializer 120b) and add them together. The summation is then provided to local sub-frame distributor 510 and the summation generated by adder 505 is split into two parts: one half provided to memory element 515a and another half to memory element 515b. The different halves include partial sums for the next stages that receive the respective S(0) 130a or S(1) 130b. The two parts are then provided to different processing elements 405 in an adjacent column. For example, in FIG. 4, each of the processing elements 405 in the first column receive inputs from the serializers (or TDM framers 410) and provides the parts to different processing elements 405 in the second column. The processing elements 405 in the second column then perform additions of its inputs and splits the result of the addition into two parts. The parts are then provided as inputs to different processing elements 405 in the third column. Eventually, the outputs of the processing elements 405 in the fourth column of the data distribution network 125 provide the beamformed signals. For example, if processing element 405 depicted in FIG. 5 is the top-right processing element 405 in FIG. 4, then its two outputs would provide S(0) 130a and S(1) 130b. Each of the other processing elements 405 in the fourth (and last) column of data distribution network 125 provides one of the beamformed signals up to S(N−1) 130c.

The butterfly topology of processing elements 405 of data distribution network 125 allows for each of the beamformed signals to be derived from a partial sum from each of the pipelined Booth complex multipliers 115a-c. For example, regarding the top-right processing element 405 in FIG. 4, S(0) 130a can be the summations of one partial sum from each of pipelined Booth complex multipliers 115a-c. As a result, each of the beamformed signals S(0) 130a, S(1) 130b to S(N−1) 130c can be derived from different partial sums from each of the pipelined Booth complex multipliers. For example, if there are sixteen pipelined Booth complex multipliers, then S(0) 130a would be the result of the summation of one partial product from each of the sixteen pipelined Booth complex multipliers.

Figure 6:
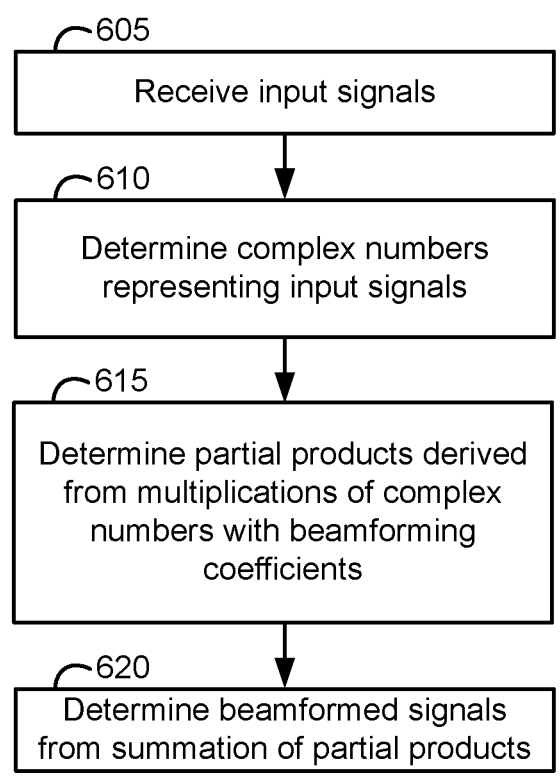
FIG. 6 is an example of a flowchart for digital beamforming.

FIG. 6 is an example of a flowchart for digital beamforming. At block 605, input signals can be received. For example, in FIG. 1, an M number of input signals including R(0) 105a, R(1) 105b, and up to R(M−1) 105c can be received. At block 610, complex numbers for the input signals can be determined. For example, in FIG. 1, fan-out 110a-c can provide complex number representations of the input signals to an N number of inputs to corresponding pipelined Booth complex multipliers 115a-c. At block 615, partial products can be derived from multiplications of the complex numbers with the beamforming coefficients. For example, the complex numbers can be multiplicands and the beamforming coefficients can be multipliers for pipelined Booth complex multipliers 115a-c. At block 620, beamformed signals can be determined from the summation of the partial products. For example, in FIG. 4, the partial products can be routed through the processing elements 405 of the data distribution network to generate beamformed signals S(0) 130a to S(N−1) 130c.

What is claimed is:

1. A beamforming system comprising:
a first multiplier circuit configured to receive a first complex number representing an amplitude and a phase of a first signal and receive a first set of weightings, the first multiplier circuit configured to generate weighted real and weighted imaginary components of the first complex number derived from a multiplication of the first complex number with the first set of weightings;
a second multiplier circuit configured to receive a second complex number representing an amplitude and a phase of a second signal and receive a second set of weightings, the second multiplier circuit configured to generate weighted real and weighted imaginary components of the second complex number derived from a multiplication of the second complex number with the second set of weightings; and
a data distribution network with processing node processors configured to receive the weighted real and imaginary components of the first and second complex numbers and configured to generate a third complex number representing an adjusted amplitude and an adjusted phase of the first signal and generate a fourth complex number representing an adjusted amplitude and an adjusted phase of the second signal, the data distribution network including a first processing node configured to determine a sum of the weighted real and imaginary components of the first and second complex numbers and provide a first portion of the sum to a second processing node and a second portion of the sum to a third processing node such that the data distribution network generates the third complex number and the fourth complex number.

2. The beamforming system of claim 1, wherein the first signal and the second signal are return user uplink signals or forward user downlink signals.

3. The beamforming system of claim 1, wherein the first portion and the second portion are different halves of the sum.

4. The beamforming system of claim 1, wherein the data distribution network includes a set of processing elements that are communicatively coupled to each other in a butterfly topology.

5. The beamforming system of claim 1, wherein the first multiplier circuit further generates the weighted real and weighted imaginary components of the first complex number using a comparison of a first weighting and a second weighting of the first set of weightings.

6. The beamforming system of claim 1, wherein the third and fourth complex numbers represent beamformed signals.

7. The beamforming system of claim 1, wherein the first and second multiplier circuits are configured as Booth multipliers.

8. The beamforming system of claim 1, wherein the weighted real and weighted imaginary components of the first complex number includes a first pair of weighted real and weighted imaginary components and a second pair of weighted real and weighted imaginary components, the weighted real and weighted imaginary components of the second complex number includes a first pair of weighted real and weighted imaginary components and a second pair of weighted real and weighted imaginary components.

9. The beamforming system of claim 8, wherein the third complex number is derived from the first pairs of the weighted real and weighted imaginary components of the first complex number and the second complex number.

10. The beamforming system of claim 9, wherein the fourth complex number is derived from the second pairs of the weighted real and weighted imaginary components of the first complex number and the second complex number.

11. A beamforming system comprising:
a first multiplier circuit configured to receive a first complex number representing a first input signal and receive a first set of beamforming coefficients, the first multiplier circuit configured to generate an N number of partial products derived from a multiplication of the first complex number with the first set of beamforming coefficients;
a second multiplier circuit configured to receive a second complex number representing a second input signal and receive a second set of beamforming coefficients, the second multiplier circuit configured to generate an N number of partial products derived from a multiplication of the second complex number with the second set of beamforming coefficients; and
a data distribution network with processing node elements configured to receive the N number of partial products from the first multiplier circuit and the N number of partial products from the second multiplier circuit, and configured to generate a third complex number representing a first beamformed signal and a fourth complex number representing a second beamformed signal such that the third complex number is derived from a summation of a partial product from the N number of partial products from the first multiplier circuit and a partial product from the N number of partial products from the second multiplier circuit, and the fourth complex number is derived from a summation of a partial product from the N number of partial products from the first multiplier circuit and a partial product from the N number of partial products from the second multiplier circuit.

12. The beamforming system of claim 11, wherein the first input signal and the second input signal are return user uplink signals or forward user downlink signals.

13. The beamforming system of claim 11, wherein each processing node element of the data distribution network includes an adder configured to add two complex numbers to generate a summed result of the two complex numbers.

14. The beamforming system of claim 13, wherein the data distribution network includes a first processing node element configured to provide a first portion of the summed result to a second processing node element and a second portion of the summed result to a third processing node element.

15. The beamforming system of claim 14, wherein the first and second portions are different halves of the summed result.

16. The beamforming system of claim 11, wherein the data distribution network includes a set of processing elements that are communicatively coupled to each other in a butterfly topology.

17. The beamforming system of claim 11, wherein the first and second multiplier circuits are configured as Booth multipliers.

18. A method comprising:
receiving, by a digital beamforming system, a first input signal, a second input signal, a first set of beamforming coefficients and a second set of beamforming coefficients, the digital beamforming system including a first multiplier circuit, a second multiplier circuit, and a data distribution network;

determining, by the digital beamforming system, a first complex number representing the first input signal and a second complex number representing the second input signal;

generating, with the first multiplier circuit, an N number of partial products derived from a multiplication of the first complex number with the first set of beamforming coefficients;

generating, with the second multiplier circuit, an N number of partial products derived from a multiplication of the second complex number with the second set of beamforming coefficients;

receiving by the data distribution network, the N number of partial products from the first multiplier circuit and the N number of partial products from the second multiplier circuit; and generating a third complex number representing a first beamformed signal and a fourth complex number representing a second beamformed signal such that the third complex number is derived from a summation of a partial product from the N number of partial products from the first multiplier circuit and a partial product from the N number of partial products from the second multiplier circuit, wherein the data distribution network provides, by a first processing node, a first portion of the summation to a second processing node and a second portion of the summation to a third processing node, and the fourth complex number is derived from a summation of a partial product from the N number of partial products from the first multiplier circuit and a partial product from the N number of partial products from the second multiplier circuit.

19. The method of claim 18, wherein the first input signal and the second input signal are return user uplink signals or forward user downlink signals.

20. The method of claim 18, wherein the first and second multiplier circuits are configured as Booth multipliers.

* * * * *